United States Patent [19]

Garcia

[11] Patent Number: 5,780,837
[45] Date of Patent: Jul. 14, 1998

[54] STANDARD CARD HAVING AN EMBEDDED MINI CHIP CARD

[75] Inventor: Andres Garcia, Barcelona, Spain

[73] Assignee: Giesecke & Devrient GmbH, Munich, Germany

[21] Appl. No.: 663,730

[22] Filed: Jun. 14, 1996

[30] Foreign Application Priority Data

Jun. 14, 1995 [DE] Germany .......................... 295 09 736.1

[51] Int. Cl.[6] .................................................. G06K 19/06
[52] U.S. Cl. ............................................. 235/492; 235/487
[58] Field of Search .................................... 235/487, 492

[56] References Cited

U.S. PATENT DOCUMENTS 5,581,065  12/1996  Nishikawa et al. .................... 235/492

FOREIGN PATENT DOCUMENTS

| 453 737 A1 | 10/1991 | European Pat. Off. . |
| 41 32 720 A1 | 4/1993 | Germany . |
| 195 13 282 A1 | 10/1996 | Germany . |

Primary Examiner—F. L. Evans
Attorney, Agent, or Firm—Bacon & Thomas

[57] ABSTRACT

The invention relates to a standard card having an embedded mini chip card which is connected with the standard card body by connecting areas. The connecting areas are severed largely or completely and interrupted by small slots. The slots prevent stresses within the mini chip card, and the mini chip card can be easily separated from the standard card body.

20 Claims, 1 Drawing Sheet

STANDARD CARD HAVING AN EMBEDDED MINI CHIP CARD

BACKGROUND OF THE INVENTION

A. Field of the Invention

This invention relates to a standard card having an embedded mini chip card which contains an electronic module and which is separated from the card body of the standard card in certain areas by slots along its contour edge and connected with the card body of the standard card by connecting areas along the remaining contour edge. The invention further relates to a method for producing such cards.

B. Background Technology

EP 0 453 737 A1 already discloses standard cards having embedded mini chip cards wherein the slots separating the contour edge of the mini chip card from the card body of the standard card are produced by punching and located practically along the entire contour edge. The mini chip card is connected with the card body of the standard card only by narrow bars. The bars are formed so as to be either easily broken out or easily punched out.

The embedded mini chip cards known from EP 0 453 737 A1 have high accuracy with respect to size but it has turned out that the contour edges of the mini chip cards have burrs along the punched slots. These burrs can lead to scratches when the standard cards with embedded mini chip cards are stacked. Furthermore, manually breaking the mini chip card out of the standard card body can cause damage to the electronic module because of the tough bar material; the quality of the contour edge is at least impaired in the area of the broken-out bars. On the other hand, punching out the bars requires a special tool which is not always at hand. Finally, once the mini chip card has been separated from the standard card body it cannot be reinserted in the standard card body and fixed there.

For the above reasons it was proposed in DE 41 32 720 A1 that one dispense completely with bars connecting the mini chip card with the standard card body and fix the mini chip card in the standard card body with the help of an adhesive film strip. To guarantee exact positioning of the mini chip card in the standard card body the mini chip card is punched out of the standard card body while initially remaining connected with the standard card body by narrow bars. After that the adhesive film strip is applied in such a way as to connect the mini chip card with the standard card body and then the remaining bars are punched out.

This production method avoids manual breaking out of the bars, but it likewise leads to a burr along the entire contour edge of the mini chip card and thus to the above-mentioned problem. Furthermore, although the mini chip card can be easily removed from the standard card body it is impossible to reinsert the mini chip card exactly in the standard card body due to the lack of stop points.

It is therefore the problem of the invention to provide a standard card having an embedded mini chip card wherein the mini chip card can be separated from the standard card without aids, has a clean contour edge after separation and can optionally be reinserted in the standard card body and fixed in an exact position. It is further the problem of the invention to provide a production method for such a standard card having an embedded mini chip card.

The problem is already solved by the applicant's related patent application Ser. No. P 195 13 282.3 laid open Oct. 10, 1996. This publication proposes producing the contour edge of the mini chip card by cutting in the standard card body on both sides. This severs the card material completely or except for a remaining extremely narrow "core". On the one hand the cut-out mini chip card can thus be separated from the standard card body without aids. On the other hand the mini chip card does not come off the standard card body by itself since no card material is removed during cutting and the mini chip card therefore remains fixed in the card body in a kind of press fit. This press fit also permits the separated mini chip card to be reinserted in the standard card body in an exact position. Finally the cut contour edge of the mini chip card has no burrs protruding beyond the surface.

However it has turned out that the cutting of the entire contour edge gives rise to stresses between the mini chip card and the standard card body so that both cards arch. These stresses presumably come about due to the penetration of the cutting knives into the card material and the material displacement in the card bodies. Due to the stresses that occur it is also relatively difficult to reinsert the mini chip card in the standard card body.

Starting out from patent application Ser. No. P 195 13 282.3 one must thus still solve the problem of avoiding deformation of the standard card having an embedded mini chip card and permitting easy reinsertion in the standard card body.

BRIEF SUMMARY OF THE INVENTION

The basic idea of the invention is to be seen in making the connecting areas with the standard card body along the contour or peripheral edge of the mini chip card as long as possible, severing these connecting areas largely or completely without removing card material, and providing the other areas of the contour edge with slots. The area with slots is small in comparison with the connecting area. The slots are preferably located in the corner areas of the contour edge of the mini chip card and produced by punching.

The advantages of the invention are to be seen in particular in that the long connecting areas between the mini chip card and the standard card body guarantee a sufficient hold of the mini chip card in the standard card body, on the one hand, while the slots prevent undesirable stresses from arising between the mini chip card and the standard card body, on the other hand. Furthermore the mini chip card can be separated from the standard card easily and manually without aids since the connecting areas of the mini chip card are severed largely or completely. The separated mini chip card has a clean contour edge true to size and largely free from burrs, and can also be reinserted in the card body due to the press fit therewith. Insertion is facilitated by the small slots. Finally the standard card having an embedded mini chip card can be produced in one operation.

DESCRIPTION OF THE DRAWINGS

Some embodiments and further advantages of the invention will be described in connection with the following figures, in which.

DETAILED DESCRIPTION

Figure 1:
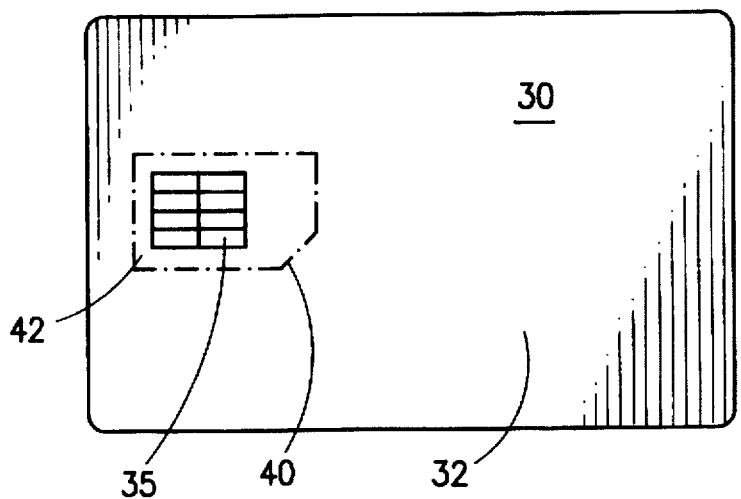
FIG. 1 shows a standard card in a plan view.

FIG. 1 shows standard card 30 having electronic module 35 located in main a gap in card body 32. The dimensions of card body 32 are defined by ISO standard 7810 and the position of electronic module 35 by ISO standard 7816/2. The dash-dot line in FIG. 1 indicates contour or peripheral edge 40 of a mini chip card which, if it has certain dimensions, is also designated a plug-in card. Electronic module 35 is located in mini chip card 42 and assumes a defined position with respect to contour edge 40.

Figure 2:
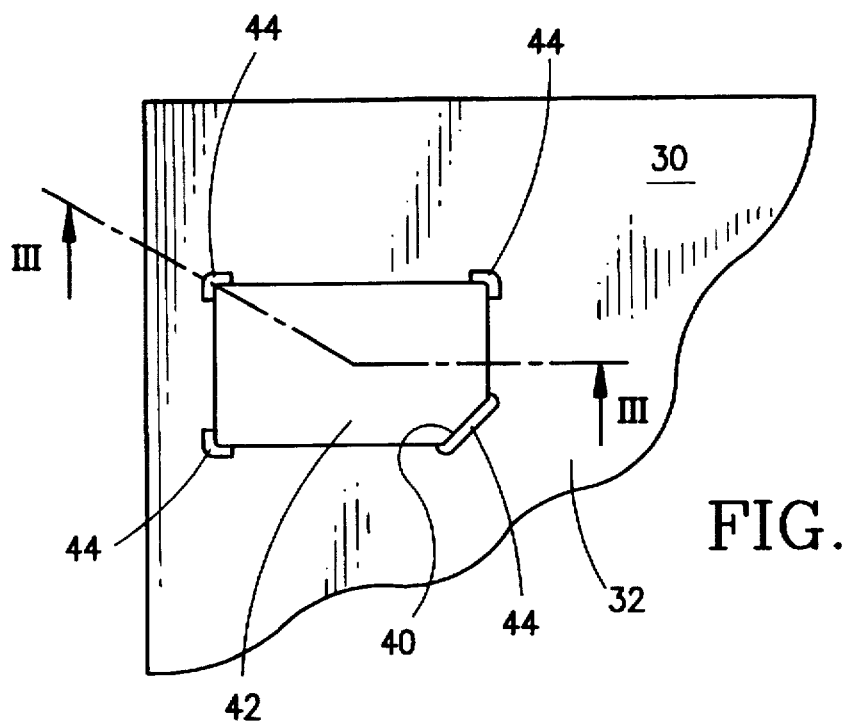
FIG. 2 shows a detail of a standard card having an embedded mini chip card in a plan view.

FIG. 2 shows enlarged and not true to scale the partial area of standard card 30 which has mini chip card 42. Electronic module 35 is omitted in FIG. 2 for clarity's sake and because it is irrelevant for the following statements. Contour edge 40 of mini chip card 42 can be subdivided into a connecting area in which mini chip card 43 remains connected with standard main card body 32, and slots 44 which interrupt the connecting area.

According to the invention the connecting areas are formed as long as possible and severed largely or completely. According to the invention slots 44 extend only along a small proportion of contour edge 40 in comparison with the connecting areas.

The connecting areas preferably take up almost the entire lengthwise and transverse sides of contour edge 40, intersecting slots 44 at least one of the corner areas of contour edge 40, as also shown in FIG. 2. The connecting areas end in each case approx. 1 to 3 mm before the round corner areas. Slots 44 can of course also be located in other areas of contour edge 40.

The connecting areas are preferably severed largely or completely by cutting in the card material of standard card body 32, the cutting in lines being located exactly on contour edge 40 of mini chip card 42. During cutting no material is removed from card body 32 so that cut-in contour edge 40 of mini chip card 42 is still in contact with card body 32 after cutting and mini chip card 42 is held in standard body 32 in a kind of press fit. On the other hand slots 44 are preferably produced by punching whereby main body card material is removed from standard main card body 32 so as to avoid stresses between the mini chip card and the card body. It has turned out that extremely small slots suffice to avoid stresses between the standard card body and the mini chip card.

It is especially advantageous to produce the incisions in the connecting areas and the slots using a tool, since standard card 30 then only needs to be positioned in the tool once and the incisions along the contour edge of the mini chip card and the slot edges located on the contour edge of the mini chip card thus pass exactly into each other. The incisions and the slots are preferably produced simultaneously, e.g. using an apparatus as presented in patent application Ser. No. P 195 13 282.3, which is adapted accordingly.

Figure 3:
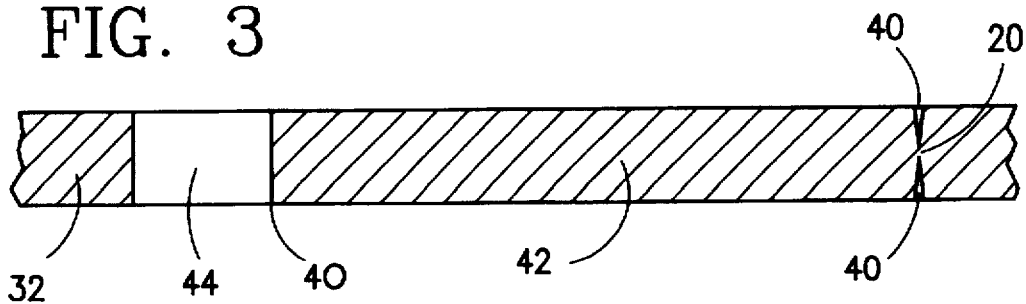
FIG. 3 shows a cross section along line 111—111 shown in FIG. 2.

FIG. 3 shows greatly enlarged and not true to scale a cross section along line III—III of FIG. 2. Contour edge 40 is severed largely in the connecting areas, which can be done e.g. by cutting in the card material of the card body on both sides for example by incisions. The cutting depth of the two incisions is preferably equal so that narrow core 20 of main card body material remains in the middle of contour edge 40. Core 20 has a thickness of approx. 150 to 450 microns, preferably 300 microns, so that mini chip card 43 can be easily separated from the standard card body manually. Since the severed core is located in the middle on the contour edge and can be formed as thin as desired, the separated mini chip card is largely free from burrs in the connecting area. It is also possible to completely sever the connecting area by machine during production of mini chip card 42. In this case the mini chip card has no burr at all in the connecting areas after being separated from the standard card body.

The connecting areas from mini chip card 42 to standard card body 32 are interrupted by slots 44, one edge of the slots coinciding with contour edge 40 of the mini chip card, as shown in FIG. 3. In the area of slots 44 mini chip card 42 is not in contact with standard card body 32, thereby preventing stresses within mini chip card 42 and facilitating reinsertion of the separated mini chip card in standard card body 32. Since slots 44 take up only a small part of contour edge 40 one can neglect the burrs arising from punching out the slots on contour edge 40.

I claim:

1. A standard card having a main body and a mini chip card bounded by a peripheral edge embedded in the main body, the mini chip card including an electronic module and being totally separated from the main body in certain areas by slots extending over a small part only of the peripheral edge relative to the total peripheral edge and connected with the main body by connecting areas along the remaining peripheral edge, the connecting areas consisting of largely severed sections of the main body extending along the remaining peripheral edge of the mini chip card.

2. The standard card having an embedded mini chip card of claim 1, wherein the connecting areas are defined by opposed cuts or incisions into the main card body from opposed sides thereof leaving a remaining relatively thin core of main body material.

3. The standard card having an embedded mini chip card of claim 2, wherein the remaining core has a thickness of 150–450 microns between the opposed cuts.

4. The standard card having an embedded mini chip card of claim 3, wherein the remaining core has a thickness of about 300 microns between the opposed cuts.

5. The standard card having an embedded mini chip card of claim 1, wherein the mini chip card has lengthwise and transverse sides intersecting at corner areas, and the connecting areas take up substantially the entire lengthwise and transverse sides of the mini chip card.

6. The standard card having an embedded mini chip card of claim 5, wherein the mini chip card has rounded corner areas whereat the slots are located and the connecting areas extend up to 1 to 3 mm from the rounded corners of the mini chip card and intersect the slots at the corner areas.

7. The standard card having an embedded mini chip card of claim 1, wherein the slots are formed by a process selected from the group including punching and milling.

8. A standard card having a main body and a mini chip card bounded by a peripheral edge embedded in the main body, the mini chip card including an electronic module and being totally separated from the main body in certain areas by slots extending over a small part only of the peripheral edge relative to the total peripheral edge and connected with the main body by connecting areas along the remaining peripheral edge, the connecting areas comprising totally severed sections of the main body extending along the remaining peripheral edge of the mini chip card so as to leave the connecting areas compressively connected together in a press fit relationship.

9. The standard card having an embedded mini chip card of claim 8, wherein the mini chip card has lengthwise and transverse sides connecting at corner areas and the connecting areas take up substantially the entire lengthwise and transverse sides of the mini chip card.

10. The standard card having an embedded mini chip card of claim 9, wherein the mini chip card has rounded corner areas whereat the slots are located and the connecting areas extend up to 1 to 3 mm from the rounded corners of the mini chip card and intersect the slots at the corner areas.

11. The standard card having an embedded mini chip card of claim 8, wherein the slots are formed by a process selected from the group including punching and milling.

12. A method for producing a standard card having a mini chip card embedded therein, the standard card including a main body having a thickness and the mini chip card being bounded by a peripheral edge in the main body, the mini chip card including an electronic module and being totally separated from the main body in certain areas by slots extending over a small part of the peripheral edge relative to the total peripheral edge and connected with the main body by connecting areas along the remaining peripheral edge, comprising largely severing the mini chip card from the main body along the connecting areas through the main body thickness so as to leave a relatively thin core of main body material and forming the slots by removal of main body material.

13. The method for producing a standard card having a mini chip card embedded therein according to claim 12, wherein the connecting areas are largely severed at the same time the slots are formed.

14. The method for producing a standard card having a mini chip card embedded therein according to claim 13, wherein the slots are formed by punching main body material.

15. The method for producing a standard card having a mini chip card embedded therein according to claim 13, wherein the slots are formed by milling main body material.

16. The method for producing a standard card having a mini chip card embedded therein according to claim 12, wherein the step of severing the main body material is carried out by using directly opposed cuts on the body material, said cuts extending partially through the main body thickness.

17. A method for producing a standard card having an mini chip card embedded therein, the standard card including a main body having a thickness and a mini chip card being bounded by a peripheral edge, the mini chip card including an electronic module and being totally separated from the main body in certain areas by slots extending over a small part of the peripheral edge relative to the total peripheral edge and connected with the main card body by connecting areas along the remaining peripheral edge, comprising severing the mini chip card from the main card body along the connecting areas without removal of main body material and forming the slots by removal of main body material while leaving the connecting areas compressively connected together in a press fit relationship.

18. The method for producing a standard card having an mini chip card embedded therein according to claim 17, wherein the slots are formed by punching main body material.

19. The method for producing a standard card having an mini chip card embedded therein according to claim 17, wherein the slots are formed by milling main body material.

20. The method for producing a standard card having a mini chip card embedded therein according to claim 17, wherein the step of severing is carried out by using opposed cuts into the main body from opposed sides of the main body.

* * * * *